United States Patent [19]

Ito

[11] Patent Number: 4,648,359
[45] Date of Patent: Mar. 10, 1987

[54] INTERNAL COMBUSTION ENGINE FOR MOTORCYCLE

[75] Inventor: Toshifumi Ito, Tokorozawa, Japan

[73] Assignee: Honda Giken Kogyo Kabushiki Kaisha, Tokyo, Japan

[21] Appl. No.: 847,118

[22] Filed: Apr. 3, 1986

Related U.S. Application Data

[63] Continuation of Ser. No. 538,902, Oct. 4, 1983, abandoned.

[30] Foreign Application Priority Data

Oct. 6, 1982 [JP] Japan ................................. 57-174449

[51] Int. Cl.$^4$ ............................................. F01L 1/46
[52] U.S. Cl. ................... 123/90.31; 123/192 B
[58] Field of Search ............. 123/90.27, 90.31, 192 B, 123/192 R, 195 R, 55 VF, 55 VS; 180/219, 230

[56] References Cited

U.S. PATENT DOCUMENTS

| | | | |
|---|---|---|---|
| 4,028,963 | 6/1977 | Nakamura et al. | 123/192 B |
| 4,230,074 | 10/1980 | Schikawa et al. | 123/55 VF X |
| 4,333,426 | 6/1982 | Gavasso et al. | 123/90.27 |
| 4,370,953 | 2/1983 | Van de Walker | 123/55 VS |
| 4,465,029 | 8/1984 | Matsumoto | 123/192 R |

FOREIGN PATENT DOCUMENTS

| | | | |
|---|---|---|---|
| 134887 | 3/1979 | German Democratic Rep. | 123/192 B |
| 159904 | 10/1982 | Japan | 123/90.31 |
| 1210249 | 10/1970 | United Kingdom | 123/192 B |

Primary Examiner—Michael Koczo
Assistant Examiner—Peggy A. Neils
Attorney, Agent, or Firm—Birch, Stewart, Kolasch & Birch

[57] ABSTRACT

An internal combustion engine for a motorcycle, comprising a crankshaft extending transversely of the motorcycle and having at least two crankpin portions, power cylinders consisting of a first bank of cylinders inclined forwardly from a vertical plane which passes through the axis of rotation of the crankshaft and a second bank of cylinders inclined rearwardly from the plane, the angle between the first and second banks of cylinders being less than 90 degrees about the axis of rotation of the crankshaft. One of the cylinders of the first bank and one of the cylinders of the second bank are associated with one of the crankpin portions and another cylinder of the first bank and another cylinder of the second bank are associated with the other crankpin portion. At least two camshafts are provided one for each of the aforesaid banks and are driven by drive means arranged in laterally middle portions of the engine casing structure. A balancer assembly is positioned forward of the crankshaft and driven for rotation about an axis parallel with the crankshaft.

6 Claims, 3 Drawing Figures (1)

INTERNAL COMBUSTION ENGINE FOR MOTORCYCLE

This application is a continuation of application Ser. No. 538,902 filed on Oct. 4, 1983, now abandoned.

FIELD OF THE INVENTION

The present invention relates to an internal combustion engine of a motorcycle and, more particularly, to a multiple-cylinder V-type engine for a motorcycle.

BACKGROUND OF THE INVENTION

In a prior-art internal combustion engine with a V-type cylinder arrangement, banks or rows of power cylinders are inclined from each other through an angle of, for example, 90 degrees about the axis of rotation of a crankshaft. The crankshaft of such an internal combustion engine is provided with balancing weights to eliminate residual unbalanced forces of inertia from reciprocating masses of piston and connecting-rod assemblies. The balancing weights thus provided on the crankshaft are, however, not capable of eliminating the linear components of the residual unbalanced inertial forces even when the power cylinders of each bank or row of the engine are arranged to partake of the same crankpin.

Even if the angle set between the two banks of power cylinders is reduced to be less than 90 degrees with a view to providing compact construction of the engine, vibrations due to the residual unbalanced inertial forces could not be eliminated satisfactorily. The vibrations originating in the engine are thus transmitted to the body structure of the motorcycle without being dampened.

SUMMARY OF THE INVENTION

The present invention contemplates elimination or reduction of such a drawback of a prior-art V-type internal combustion engine for a motorcycle.

It is, accordingly, an important object of the present invention to provide a V-type internal combustion engine in which the power cylinders are arranged in two banks or rows which are inclined from each other through an angle less than the angle which has conventionally been set in a prior-art V-type internal combustion engine for a motorcycle. A V-type internal combustion engine proposed by the present invention is thus adapted to reduce the overall fore-and-aft measurement of a motorcycle and the vibrations to be transmitted from the engine to the body structure of the motorcycle.

In accordance with the present invention, there is provided an internal combustion engine for a motorcycle, comprising an engine casing structure, a crankshaft rotatable about an axis fixed with respect to the engine casing structure and axially extending in a transverse direction of the motorcycle, the crankshaft having at least two crankpin portions which are axially spaced apart from each other, power cylinders consisting of a first bank of power cylinders inclined forwardly and downwardly from a vertical plane which passes through the axis of rotation of the crankshaft and a second bank of power cylinders inclined rearwardly from the vertical plane, the angle between the first and second banks of power cylinders being less than 90 degrees about the axis of rotation of the crankshaft, one of the power cylinders of the first bank and one of the power cylinders of the second bank being associated with one of the crankpin portions and another one of the power cylinders of the first bank and another one of the power cylinders of the second bank being associated with the other crankpin portion, at least two overhead camshafts each provided for each of the aforesaid banks and parallel with the axis of rotation of the crankshaft, camshaft drive means operative to provide driving engagement from the crankshaft to the camshafts, the camshaft drive means being arranged in laterally middle portions of the engine casing structure, a balancer assembly positioned forwardly of the crankshaft and comprising a balance shaft rotatable about an axis fixed with respect to the engine casing structure and substantially parallel with the axis of rotation of the crankshaft, and at least two balancing weights securely mounted on the balance shaft, and balancer drive means for providing driving engagement from the crankshaft to the balance shaft, the drive means being located in the vicinity of at least one end of each of the crankshaft and the balance shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The features and advantages of an internal combustion engine according to the present invention will be more clearly appreciated from the following detailed description given hereinbelow and taken in conjunction with the accompanying drawings are given by way of illustration only, and thus are not limitative of the present invention and wherein.

DESCRIPTION OF THE PREFERRED EMBODIMENT

Figure 1:
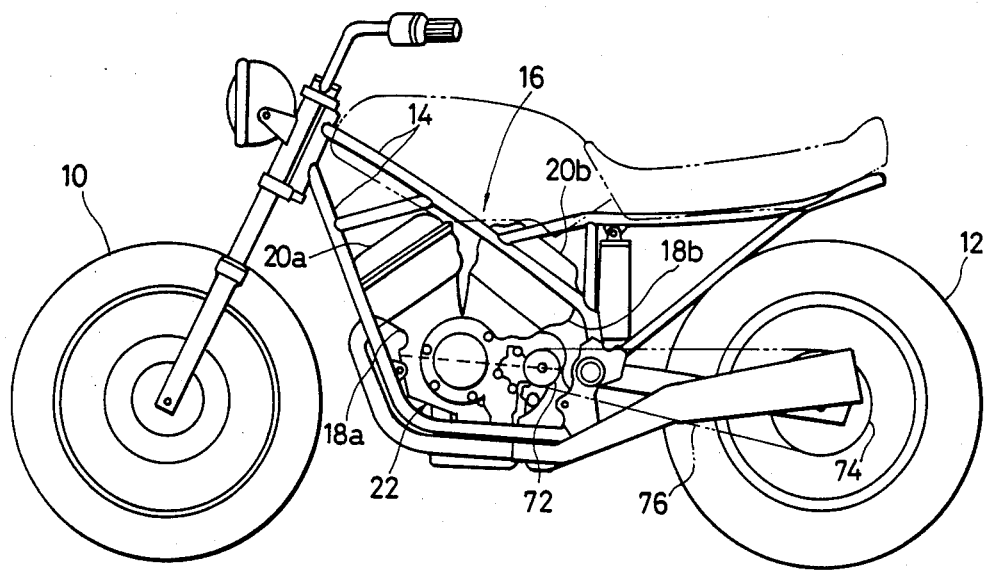
FIG. 1 is a side elevation view showing a motorcycle equipped with a V-type internal combustion engine embodying the present invention.

Referring to FIG. 1 of the drawings, a motorcycle equipped with an internal combustion engine embodying the present invention is shown including front and rear road wheels 10 and 12, a frame structure 14 connecting the wheels 10 and 12 together, and a multiple-cylinder V-type internal combustion engine 16 supported on the frames 14 by means of bolts and nuts preferably through rubber mounts. The internal combustion engine 16 has a casing structure which is composed of front and rear cylinder block portions 18a and 18b and front and rear cylinder head portions 20a and 20b secured to and positioned above the front and rear cylinder block portions 18a and 18b, respectively. The engine casing structure further comprises a crankcase 22 which is positioned below the cylinder block portions 18a and 18b and which is secured to the bottoms of the cylinder block portions 18a and 18b.

Figure 2:
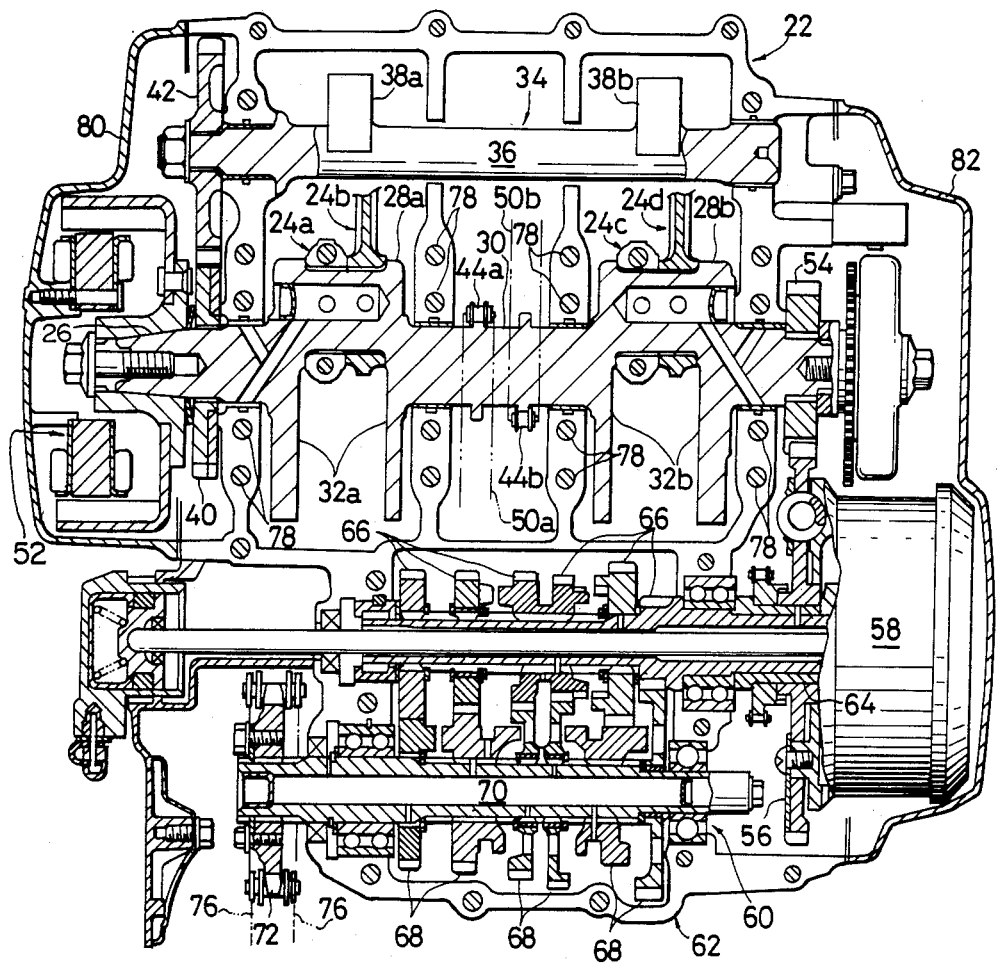
FIG. 2 is a horizontal sectional view of the internal combustion engine embodying the present invention.
Figure 3:
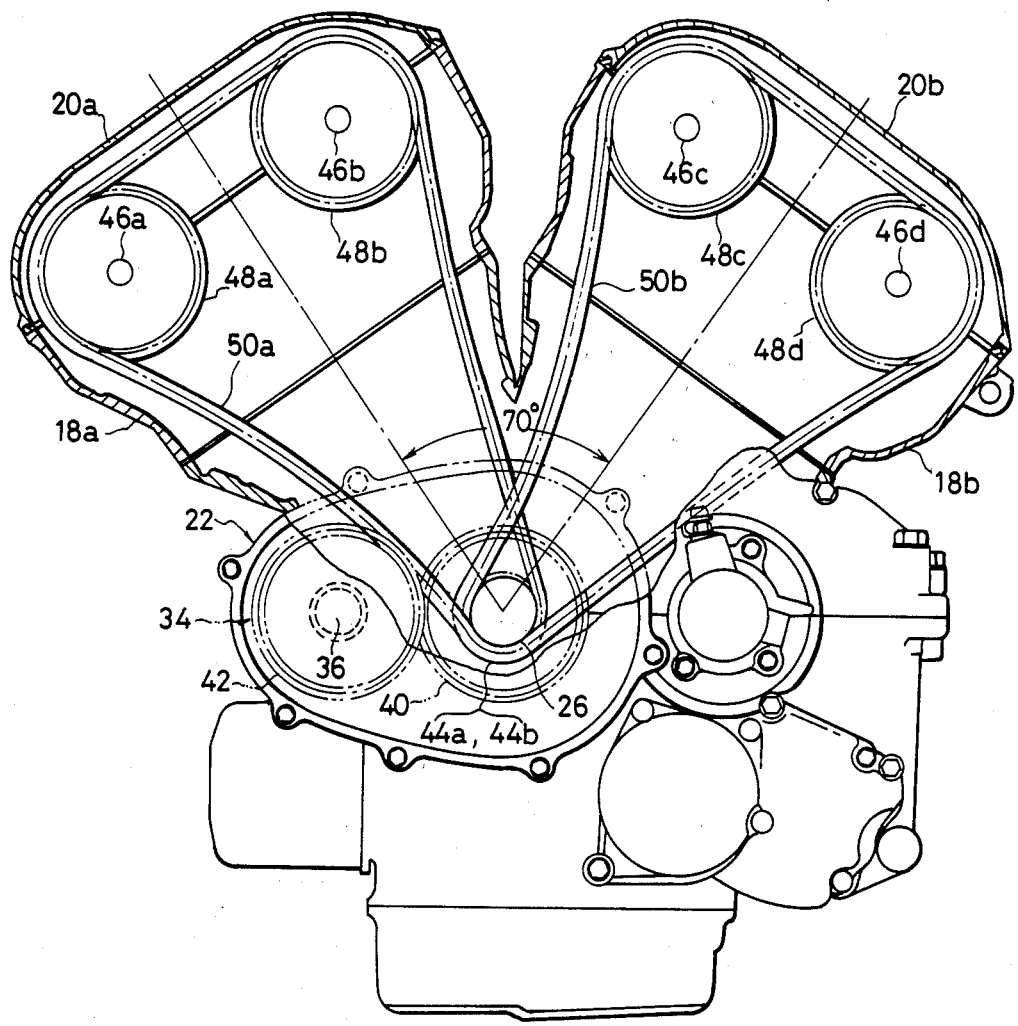
FIG. 3 is a vertical sectional view of the internal combustion engine shown in FIG. 2.

The internal combustion engine 16 is herein assumed to be of the four-cylinder four-stroke-cycle by way of example and comprises a first pair of power cylinders 24a and 24b and a second pair of power cylinders 24c and 24d as shown in FIG. 2 in which each of the power cylinders is represented by the connecting rod thereof. The connecting rods of these power cylinders 24a, 24b, 24c and 24d are connected each at one end to a crankshaft 26 which is accommodated within the crankcase 22. The crankshaft 26 extends in a transverse direction of the motorcycle and has opposite axial end portions journaled in opposite side wall portions of the crankcase 22 as shown. The crankshaft 26 further has first and second crankpin portions 28a and 28b which are axially spaced from each other across an axially middle portion 30, and first and second pairs of crank weight portions or webs 32a and 32b projecting radially away from the first and second crankpin portions 28a and 28b, respectively. The crankpin portions 28a and 28b and the crank weight portions 32a and 32b of the crankshaft 26 are revolvable about the axis of rotation of the crankshaft 26. The connecting rods of the first pair of power cylinders 24a and 24b have crank end portions slidably received jointly on the first crankpin portion 28a of the crankshaft 26 and, likewise, the connecting rods of the second pair of power cylinders 24c and 24d have crank end portions slidably received jointly on the second crankpin portion 28b of the crankshaft 26 as shown. Though not shown in the drawings, the connecting rod of each of the power cylinders 24a, 24b, 24c and 24d further has a piston end portion pivotally connected to the reciprocating piston of each power cylinder, as well known in the art. One of the first pair of power cylinders 24a and 24b and one of the second pair of power cylinders 24c and 24d jointly form one bank or row and the other of the first pair of power cylinders 24a and 24b and the other of the second pair of power cylinders 24c and 24d jointly form another bank or row. In the arrangement shown in FIG. 2, the power cylinder 24a of the first pair and the power cylinder 24c of the second pair form a first bank and the power cylinder 24b of the first pair and the power cylinder 24d of the second pair form a second bank. The first bank of power cylinders 24a and 24c are inclined forwardly and downwardly from a vertical plane which passes through the axis of rotation of the crankshaft 26 and the second bank of power cylinders 24c and 24d are inclined rearwardly and downwardly from the particular vertical plane, as will be seen from FIG. 3 of the drawings. In an internal combustion engine according to the present invention, the angle thus set between the first and second or front and rear banks of power cylinders about the axis of rotation of the crankshaft 26 is less than 90 degrees and is preferably within the range of between about 40 degrees and 80 degrees about the axis of rotation of the engine crankshaft 26. In the preferred embodiment of the present invention, the angle between the front bank of power cylinders 24a and 24c and the rear bank of power cylinders 24b and 24d is assumed to be about 70 degrees about the axis of rotation of the engine crankshaft 26 as indicated in FIG. 3. Preferably, the forwardly inclined power cylinders 24a and 24c in particular are positioned so that the axes thereof are inclined slightly toward the axes of the other power cylinders 24b and 24d, respectively.

The crankcase 22 has further accommodated therein a balancer assembly 34 which is positioned in front of the crankshaft 26 and below the forwardly inclined bank of power cylinders 24a and 24c as shown in FIG. 3. The balancer assembly 34 includes a balance shaft 36 extending in parallel with the crankshaft 26 and having opposite axial end portions journaled in the opposite side wall portions of the crankcase 22. The balance shaft 36 has securely carried thereon first and second balancing weights 38a and 38b which are aligned with the above described first and second crankpin portions 28a and 28b, respectively, of the crankshaft 26 in fore-and-aft directions of the motorcycle. The crankshaft 26 has securely mounted on one axial end portion thereof a driving gear 40 which is held in mesh with a driven gear 42 securely carried on one axial end portion of the balance shaft 36. The rotation of the crankshaft 26 is thus transmitted to the balance shaft 36 through the gears 40 and 42 when the crankshaft 26 is driven for rotation about the axis of rotation thereof. The balance shaft 36 is positioned in front of the crankshaft 26 in such a manner as to have its axis of rotation located with respect to the axis of rotation of the crankshaft 26 so that the linear components of the residual unbalanced forces of inertia from the reciprocating masses of the individual piston and connecting-rod assemblies are eliminated or reduced to a minimum by the balancer assembly 34. The gears 40 and 42 are coaxially mounted on the shafts 26 and 36 and preferably have equal numbers of teeth and pitch circles of equal diameters. The crankshaft 26 has first and second driving sprocket wheels 44a and 44b coaxially formed on its axially middle portion 30. The middle portion 30 of the crankshaft 26 is located in a laterally middle portion of the crankcase 22 so that the driving sprocket wheels 44a and 44b of the axially middle portion 30 of the crankshaft 26 are located in a laterally middle portion of the engine casing structure.

Though not shown in the drawings, each of the power cylinders 24a, 24b, 24c and 24d has incorporated therein intake and exhaust valves as is well known in the art. The intake and exhaust valves of each of the forwardly inclined power cylinders 24a and 24c are driven by cams (not shown) on overhead camshafts 46a and 46b, respectively, and the intake and exhaust valves of each of the rearwardly inclined power cylinders 24b and 24d are driven by cams (not shown) on overhead camshafts 46c and 46d, respectively. The camshafts 46a, 46b, 46c and 46d extend parallel with the crankshaft 26. Each of the overhead camshafts 46a and 46b associated with the bank of power cylinders 24a and 24c has opposite end portions journaled in the first cylinder head portion 20a of the engine casing and, likewise, each of the camshafts 46c and 46d associated with the bank of power cylinders 24b and 24d, respectively, has opposite end portions journaled in the second cylinder head portion 20b of the engine casing as will be seen from FIG. 3. The camshafts 46a, 46b, 46c and 46d have securely carried thereon driven sprocket wheels 48a, 48b, 48c and 48d, respectively. An endless chain 50a is passed around the first driving sprocket wheel 44a on the crankshaft 26 and the driven sprocket wheels 48a and 48b on the camshafts 46a and 46b and, likewise, an endless chain 50b is passed around the second driving sprocket wheel 44b on the crankshaft 26 and the driven sprocket wheels 48c and 48d on the camshafts 46c and 46d, as also shown in FIG. 3. Thus, the rotation of the crankshaft 26 is transmitted to the camshafts 46a and 46b through the driving sprocket wheel 44a, endless chain 50a and driven sprocket wheels 48a and 48b, respectively, and to the camshafts 46c and 46d through the driving sprocket wheel 44b, endless chain 50b and driven sprocket wheels 48c and 48d, respectively. By rotation of the camshafts 46a, 46b, 46c and 46d thus driven, the intake and exhaust valves of each of the power cylinders 24a, 24b, 24c and 24d are driven to alternately open and close at timings which vary with the speed of rotation of the crankshaft 26 as is well known in the art. The driving sprocket wheels 44a and 44b for the camshafts 50a and 50b located on the axially middle portion 30 of the crankshaft 26, the driven sprocket wheels 48a and 48b on the camshafts 46a and 46b and the driven sprocket wheels 48c and 48d on the camshafts 46c and 46d as well as the endless chains 50a and 50b are located in laterally middle portions of the engine casing structure. The driving sprocket wheels 44a and 44b, driven sprocket wheels 48a, 48b, 48c and 48d and endless chains 50a and 50b constitute the combination camshaft drive means to drive the camshafts 46a, 46b, 46c and 46d. The camshaft drive means is located in laterally middle portions of the engine casing structure composed of the cylinder blocks 18a and 18b, cylinder heads 20a and 20b and crankcase 22. Designated by reference numeral 52 in FIG. 2 is an alternator which is driven by the crankshaft 26 to generate an electric current to charge a battery or operate various electrical units of the motorcycle.

As shown in FIG. 2, the crankshaft 26 has further securely mounted on its axial end portion opposite to the above described driving gear 40 an output gear 54 which is rotatable with the crankshaft 26 about the axis of rotation thereof. The output gear 54 is held in mesh with an input gear 56 of a clutch assembly 58 operatively intervening between the output gear 54 and a countershaft power transmission assembly which is in its entirety designated by reference numeral 60. The clutch assembly 58 has an output element (not shown) to be engaged by the input gear 56 for rotation therewith. The power transmission assembly 60 comprises a transmission casing 62 integral with and located at the rear of the crankcase 22 and a transmission main shaft 64 having an intermediate portion journaled in a bearing fitted in an end wall portion of the transmission casing 62. The main shaft 64 has another end portion securely connected to or otherwise engaged by the above mentioned input element of the clutch assembly 58 for rotation therewith. A series of main shaft gears designated commonly by reference numeral 66 are splined to or otherwise coaxially mounted on the main shaft 64. The main shaft gears 66 are drivingly engageable selectively with countershaft gears 68 which are splined to or otherwise coaxially rotatable with a transmission countershaft 70. The countershaft 70 extends in parallel with the main shaft 64 and has opposite axial end portions journaled in bearings fitted in opposite end wall portions of the transmission casing 62 as shown. Some of the main shaft and countershaft gears 66 and 68 are engaged by shifting forks (not shown) so that any of the main shaft gears 66 is brought into driving engagement with any of the countershaft gears 68 by manual actuation of any of the shifting forks as is well known in the art. The countershaft 70 is thus driven for rotation at a speed proportioned in any of a plurality of predetermined ratios to the speed of rotation of the main shaft 64 by selection of a driving gear out of the main shaft gears 66 and a driven gear out of the countershaft gears 68. The countershaft 70 has securely carried on one axial end portion thereof a driving sprocket wheel 72. Preferably, the crankshaft 26, transmission main shaft 64 and transmission countershaft 70 are positioned so that a generally horizontal plane passes through these shafts.

Turning back to FIG. 1 of the drawings, the rear road wheel 12 of the motorcycle has a driven sprocket wheel 74 coaxially secured thereto. Endless chains 76 are passed between the driving sprocket wheel 72 on the countershaft 70 and the driven sprocket wheel 74 thus rotatable with the rear road wheel 12 of the motorcycle. When the countershaft 70 is driven for rotation about the center axis thereof, the rotation of the countershaft 70 is thus transmitted to the rear road wheel 12 through the driving sprocket wheel 72, endless chains 76 and driven sprocket wheel 74.

The crankcase 22 and the transmission casing 62 as hereinbefore mentioned are constituted by two, upper and lower unitary members which are split from each other on a generally horizontal plane and which are clamped together by suitable fastening means such as bolts 78 as shown in FIG. 2. The plane thus defined by the lower and upper contact surfaces of these members preferably passes through the crankshaft 26, transmission main shaft 64 and transmission countershaft 70. The members and elements provided outside the opposite end wall portions of the crankcase 22 are enclosed within side covers 80 and 82 which are fixedly yet detachably attached to the crankcase 22 by suitable fastening means (not shown).

In operation, the power output of the engine 16 (FIG. 1) is delivered from the crankshaft 26 which is driven for rotation by the individual power cylinders 24a, 24b, 24c and 24d. The rotation of the crankshaft 26 about the axis of rotation thereof is transmitted on one hand to the input gear 56 of the clutch assembly 58 through the output gear 54 on the crankshaft 26. When the clutch assembly 58 is held in a coupled condition, the rotation of the input gear 56 in turn is transmitted to the transmission main shaft 64 and from the transmission main shaft 64 to the transmission countershaft 70 through any of the gears 66 on the main shaft 64 and any of the gears 68 on the countershaft 70. The rotation of the transmission countershaft 70 is transmitted to the rear road wheel 12 of the motorcycle through the driving sprocket wheel 72 on the countershaft 70, the endless chain 76 and the driven sprocket wheel 74 on the rear road wheel 12. The rotation of the crankshaft 26 about the axis of rotation thereof is transmitted on the other hand to the camshafts 46a and 46b through the first driving sprocket wheel 44a, the endless chain 50a and the driven sprocket wheels 48a and 48b and to the camshafts 46c and 46d through the second driving sprocket wheel 44b, the endless chain 50b and the driven sprocket wheels 48c and 48d. The intake and exhaust valves provided in each of the power cylinders 24a, 24b, 24c and 24d are thus driven to alternately open and close at timings which vary with the speed of rotation of the crankshaft 26. The rotation of the crankshaft 26 is further transmitted to the balance shaft 36 through the driving gear 40 on the crankshaft 26 and the driven gear 42 on the balance shaft 36.

If desired, the balance shaft 36 may be driven for rotation by means of the output gear 54 on the crankshaft 26. For this purpose, the combination of the driving gear 40 on the crankshaft 26 and the driven gear 42 on the balance shaft 36 may be substituted by the combination of a driving gear constituted by the output gear 54 and a driven gear securely carried on the crankshaft 26 and held in mesh with the output gear 54. Such a combination of the gear 54 and the gear driven by the gear 54 and mounted on the balance shaft 36 may be used in addition to the combination of the gears 40 and 42. The combination of the gears 40 and 42 and/or the combination of the gear 52 and the gear driven by the gear 52 and mounted on the balance shaft 36 constitute balancer drive means in an internal combustion engine according to the present invention.

An internal combustion engine embodying the present invention constructed and operative as hereinbefore described has the following advantages over prior-art internal combustion engines for motorcycles.

(1) The power cylinders 24a, 24b, 24c and 24d being arranged in two banks or rows which are inclined from each other through the angle of 70 degrees or any angle within the range of between 40 degrees and 80 degrees about the axis of rotation of the crankshaft 26, the vibrations due to the residual unbalanced forces of inertia from the reciprocating masses of the individual piston and connecting-rod assemblies can be largely eliminated by the balancer assembly 34. The crank weight portions 32a and 32b of the crankshaft 26 per se can not eliminate such vibrations due to the residual unbalanced forces of inertia. A motorcycle equipped with an internal combustion engine according to the present invention will thus provide enhanced comfort when riding.

(2) By reason of the V-type arrangement of the power cylinders 24a, 24b, 24c and 24d and since these power cylinders are arranged in two banks or rows which are inclined from each other through the angle of 70 degrees, the lateral and fore-and-aft measurements can be reduced significantly. This provides compact and lightweight constructions of the engine 16 and accordingly of the motorcycle as a whole.

(3) The balancer assembly 34 is positioned in front of the crankshaft 26 and below the forwardly inclined bank of power cylinders 24a and 24c so that the provision of the balancer assembly 34 does not require extension of the fore-and-aft measurement of the engine 16.

(4) Since the camshaft driving sprocket wheels 44a and 44b are located on the axially middle portion 30 of the crankshaft 26, the sprocket wheels 48a and 48b on the camshafts 46a and 46b and the sprocket wheels 48c and 48d on the camshafts 46c and 46d as well as the chains 50a and 50b are located in laterally middle portions of the engine casing structure. By reason of such arrangement of the camshaft drive means, the external configurations of the front and rear portions of the engine 16 will not appear pronouncedly different between the right and left sides of the engine 16.

(5) Furthermore, due to the fact that the driving engagement from the crankshaft 26 to the balance shaft 36 is provided by the gears 40 and 42 and that the gears 40 and 42 are located on the left or right side of the engine casing structure and are far from the sprocket wheels 44a and 44b, an operator is allowed ready and convenient access to the gears 40 and 42 without requiring assistance to pull or remove the chains 50a and 50b associated with the sprocket wheels 44a and 44b during assembly or servicing of the engine 16.

(6) The camshaft driving chains 50a and 50b being provided in laterally middle portions of the engine casing structure causes the structural unbalance between the right and left sides of the engine 16 with one bank of power cylinders inclined forwardly and the other bank of cylinders inclined rearwardly to appear less serious than it actually is.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In an internal combustion engine mounted on a motorcycle, which comprises an engine casing structure connected to a frame structure of said motorcycle:

a crankshaft rotatable about an axis fixed with respect to said engine casing structure and axially extending in a direction transverse to a forward and aft direction of the motorcycle, said crankshaft having at least one crankpin portion provided with a pair of crank weight webs projecting radially away therefrom;

first and second banks of power cylinders mounted on said engine casing structure above said crankpin portion, said first and second banks of power cylinders respectively inclined forwardly and rearwardly from a vertical plane which passes through the rotational axes of said first and second power cylinders is less than 90 degrees about the rotational axis of said crankshaft;

first and second pistons respectively accommodated with said first and second cylinders;

first and second connecting rods respectively interconnecting between said first and second pistons and said crankpin portion;

at least one camshaft rotatable about an axis substantially parallel with the rotational axis of said crankshaft; and camshaft drive means operative to provide driving engagement from said crankshaft to said camshaft, the improvement which comprises:

a single balance shaft positioned within said engine casing and forwardly of said crankshaft and below said first power cylinder and being rotatable about an axis with respect to said engine casing structure and substantially parallel with the rotational axis of said crankshaft;

a balancing weight mounted on said balance shaft substantially aligned with said crankpin portion; and balancer drive means for providing synchronized driving engagement from said crankshaft to said balance shaft which rotates at the same speed as said crankshaft.

2. The improvement as defined by claim 1, in which said angle between the central axes of said first and second power cylinders is smaller than 80 degrees and larger than 40 degrees about the axis of rotation of said crankshaft.

3. The improvement as defined by claim 1, in which said angle between the central axes between said power cylinders is about 70 degrees about the axis of rotation of the crankshaft.

4. The improvement as defined by claim 1, in which said balancer drive means comprises a driving gear coaxially rotatable with said crankshaft and located in the vicinity of one axial end of the crankshaft and a driven gear coaxially rotatable with said balance shaft and located in the vicinity of one axial end of the balance shaft, the driving and driven gears being in mesh with each other.

5. The improvement as defined in claim 1, in which said balancing weight is disposed at an axial position of said balance shaft within a region defined between said crank weight webs.

6. In an internal combustion engine mounted on a motorcycle, which comprises an engine casing structure connected to a frame structure of said motorcycle:
- a crankshaft rotatable about an axis fixed with respect to said engine casing structure, said crankshaft having at least one crankpin portion provided with a pair of crank weight webs projecting radially away therefrom;
- first and second banks of power cylinders mounted on said engine casing structure above said crankpin portion, said first and second banks of power cylinders respectively inclined forwardly and rearwardly from a vertical plane which passes through the rotational axes of said first and second power cylinders is less than 90 degrees about the rotational axis of said crankshaft;
- first and second pistons respectively accommodated with said first and second cylinders;
- first and second connecting rods respectively interconnecting between said first and second pistons and said crankpin portion;
- at least one camshaft rotatable about an axis substantially parallel with the rotational axis of said crankshaft; and
- camshaft drive means operative to provide driving engagement from said crankshaft to said camshaft, the improvement which comprises:
- a single balance shaft positioned within said engine casing and forwardly of said crankshaft and below said first power cylinder and being rotatable about an axis with respect to said engine casing structure and substantially parallel with the rotational axis of said crankshaft;
- a balancing weight mounted on said balance shaft at an axial position of said balance shaft within a region defined between said crank weight webs; and
- balancer drive means for providing synchronized driving engagement from said crankshaft to said balance shaft which rotates at the same speed as said crankshaft.

* * * * *